US009400076B2

(12) United States Patent
Early et al.

(10) Patent No.: US 9,400,076 B2
(45) Date of Patent: Jul. 26, 2016

(54) ELECTRICAL AUTONOMOUS PIPELINE ISOLATION TOOL

(75) Inventors: Ciaran Early, Dublin (IE); Gary Murray, Dublin (IE); Raymond Honour, Kent (GB)

(73) Assignee: THE SAFER PLUG COMPANY LIMITED, Grand Cayman (KY)

( * ) Notice: Subject to any disclaimer, the term of this patent is extended or adjusted under 35 U.S.C. 154(b) by 135 days.

(21) Appl. No.: 14/007,783

(22) PCT Filed: Mar. 13, 2011

(86) PCT No.: PCT/EP2011/055036
§ 371 (c)(1),
(2), (4) Date: Sep. 26, 2013

(87) PCT Pub. No.: WO2012/130317
PCT Pub. Date: Oct. 4, 2012

(65) Prior Publication Data
US 2014/0020782 A1  Jan. 23, 2014

(51) Int. Cl.
*F16L 55/128*  (2006.01)
*F16L 55/44*  (2006.01)

(52) U.S. Cl.
CPC ........... *F16L 55/1283* (2013.01); *F16L 55/128* (2013.01); *F16L 55/44* (2013.01)

(58) Field of Classification Search
CPC ............................. F16L 55/44; F16L 55/1283
USPC ......................................... 138/89, 89.1–89.4
See application file for complete search history.

(56) References Cited

U.S. PATENT DOCUMENTS 3,561,490 A * 2/1971 Little ............................... 138/90
3,746,026 A * 7/1973 Herring ............................. 137/1
(Continued)

FOREIGN PATENT DOCUMENTS

| WO | 97/28398 | 8/1997 |
| WO | 03/067134 | 8/2003 |
| WO | 2006/101398 | 9/2006 |

OTHER PUBLICATIONS

International Search Report dated Nov. 15, 2011.

*Primary Examiner* — Paul R Durand
*Assistant Examiner* — Vishal Pancholi
(74) *Attorney, Agent, or Firm* — Hoffmann & Baron, LLP

(57) ABSTRACT

The invention provides an all electrical autonomous pipeline isolation tool for use in offshore and onshore pipeline isolation; the electrical autonomous pipeline isolation tool comprising a first part and a second part, the first and second parts being moveable relative to each other, the electrical autonomous pipeline isolation tool also comprising at least one sealing member which is moveable between an unset condition in which the sealing member is disengaged and the isolation tool is able to travel along inside a pipeline to a predetermined location; and a set condition in which the sealing member is engaged against an internal wall of a pipline such that a seal is formed between the sealing member of the isolation tool and the internal wall of the pipeline; the isolation tool being moveable between the unset condition and the set condition under action of the first part and the second part moving relative to each other. The all electrical pipeline isolation tool of the invention is controlled using an Extremely Low Frequency (ELF) communications system.

Advantageously, the all electrical pipeline isolation tool of the invention is completely autonomous, without the necessity for a hydraulic pump and motor, hydraulic accumulator, hydraulic valving, hydraulic piston or hydraulic piping and hydraulic control system.

18 Claims, 7 Drawing Sheets

(56) References Cited

U.S. PATENT DOCUMENTS

| | | | |
|---|---|---|---|
| 4,077,435 A * | 3/1978 | Van Scoy | 138/93 |
| 4,422,477 A * | 12/1983 | Wittman et al. | 138/89 |
| 5,293,905 A * | 3/1994 | Friedrich | 138/89 |
| 5,924,454 A * | 7/1999 | Dyck et al. | 138/89 |
| 7,568,504 B2 * | 8/2009 | Syse et al. | 138/31 |
| 7,878,221 B2 * | 2/2011 | Aleksandersen et al. | 138/98 |
| 2005/0241710 A1 * | 11/2005 | Early et al. | 138/89 |
| 2010/0051130 A1 * | 3/2010 | Syse et al. | 138/89 |

* cited by examiner

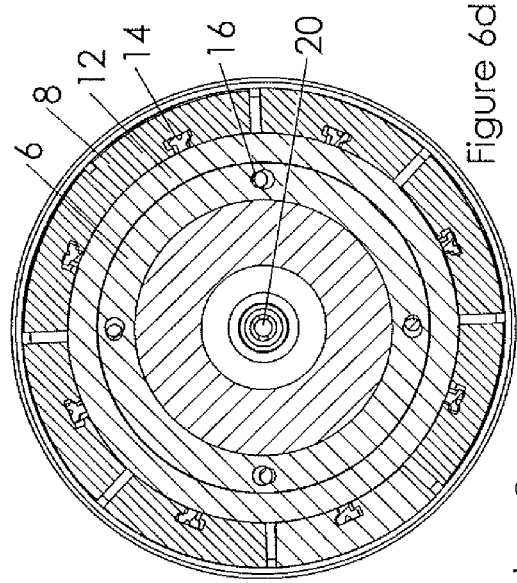
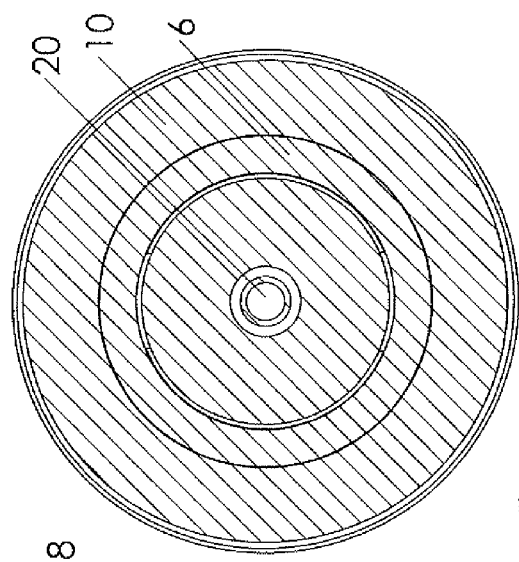
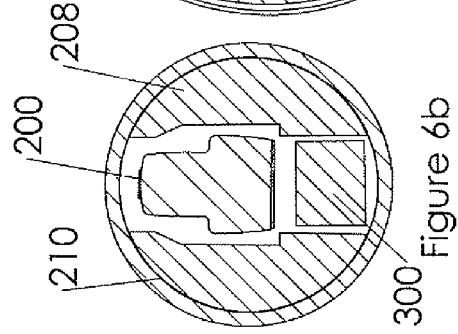
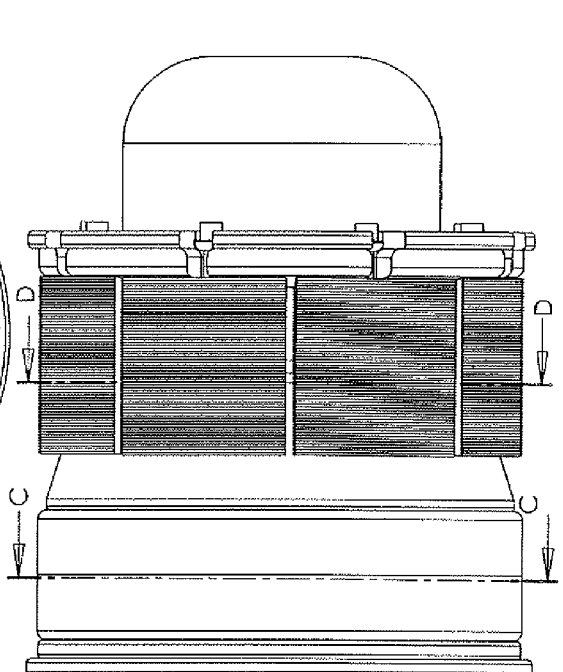
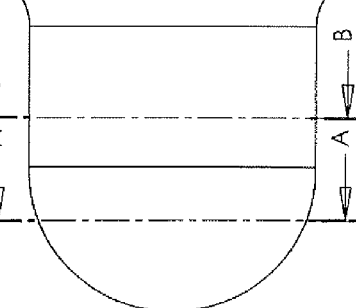

ELECTRICAL AUTONOMOUS PIPELINE ISOLATION TOOL

This application is the U.S. National Phase of, and Applicants claim priority from, International Patent Application Number PCT/EP2011/055036 filed 31 Mar. 2011, which is incorporated herein by reference.

The present invention relates to an electrical pipeline isolation tool in particular to an autonomous electrical pipeline isolation tool suitable for use to isolate a pipeline in any location.

Traditionally, repair or maintenance of oil and gas pipelines was conducted by depressurising the line, removing the valve or sections to be serviced and replacing the removed valve or section with a new valve or a new section of pipeline. The new section(s) of pipeline were then flanged or welded into place, and the pipeline was pressure tested, and reinstated back into service.

To avoid taking an entire pipeline out of service, hot tap and stopple solutions were developed. The hot tap and stopple process involved installation of sleeves and sandwich valves onto a pipeline by clamping or welding, and then cutting (tapping) into the pipeline steel (while it was still under pressure) and inserting a blocking plug (a stopple) through the tapped hole, into the tapped pipeline, located at the end of an articulating arm. This stopple insertion action was conducted at two separate locations on the pipeline. The holes tapped into the pipeline were then connected using a by pass pipe and the pipeline was then able to stay in service, through the by-pass. The by-pass was normally continued at a lower pressure and reduced capacity while repair work to the defective section of line was conducted.

Later, pipeline isolation plugs were introduced. These hydraulically powered plugs were installed into the ends of pipelines, were pushed to their isolation location, and were controlled through hydraulic umbilicals, which were managed through pressurized glands (known as stripper boxes) built into the specially modified end doors of launcher barrels. The distance that these umbilical controlled tools could be inserted into pipelines was limited to approximately 500 meters, from the pipeline end door, or up to 8×90 degree bends (which imparted the equivalent restraining friction of two full turns of hydraulic umbilical around a steel rod).

The distance constraint of umbilical controlled isolation plugs was then solved by remotely operated autonomous pipeline isolation plugs, or plugs which did not require any controlling umbilical attachment. These isolation plugs could be launched hundreds of miles into a pipeline to the desired isolation location. They utilized extremely low frequency magnetics to communicate controlling instructions and status information to and from the isolation tool, from outside of the pipeline. They carried a bank of batteries to drive their onboard hydraulic systems which operated to seal the pipeline thus perform the functionality of the isolation plug. Onboard hydraulic systems have been subject to leaks, and reliability problems leading to failure of these hydraulic systems.

Furthermore, converting electrical energy into hydraulic power which then has to be converted into mechanical power gives poor conversion efficiency.

It is therefore an object of the present invention to provide a pipeline isolation tool, suitable for use in offshore and onshore pipeline isolation which aims to overcome the reliability and efficiency problems associated with hydraulic isolation tools.

It is acknowledged that the term 'comprise' may, under varying jurisdictions be provided with either an exclusive or inclusive meaning. For the purpose of this specification, the term "comprise" shall have an inclusive meaning, that it is to be taken to mean an inclusion of not only the listed components it directly references, but also other non-specified components. Accordingly, the term 'comprise' is to be attributed with as broad an interpretation as possible within any given jurisdiction and this rationale should also be used when the terms 'comprised' and/or 'comprising' are used.

It is to be understood that the terms, "autonomous pipeline isolation apparatus", "autonomous pipeline isolation tool", "autonomous pipeline isolation plug" and "double block and bleed autonomous pipeline isolation tool" are used interchangeably throughout the specification to describe a tool which is used to isolate a section of a pipeline transportation system. The term, "double block and bleed" is used to describe the provision of two barriers within a section of pipe and the ability to depressurise the section of pipe between the two barriers. It is also understood that the term 'multi-set' in relation to pipeline isolation tools means a tool that can be re-set on more than one occasion, i.e. that means that the isolation tool can be used to isolate a pipeline on more than one occasion.

Further aspects of the present invention will become apparent from the following description.

According to a first aspect of the invention, the present invention provides an electrical autonomous pipeline isolation tool for use in offshore and onshore pipeline isolation. This electrical autonomous pipeline isolation tool comprises a first part and a second part, the first and second parts being moveable relative to each other, the electrical autonomous pipeline isolation tool also comprising at least one sealing member which is moveable between an unset condition in which the sealing member is disengaged and the isolation tool is able to travel along a pipeline to a predetermined location; and a set condition in which the sealing member is engaged against an internal wall of a pipeline such that a seal is formed between the sealing member of the isolation tool and the internal wall of the pipeline; the isolation tool being moveable between the unset condition and the set condition under action of the first part and the second part moving relative to each other. The all electrical pipeline isolation tool of the invention is controlled using an Extremely Low Frequency (ELF) communications system.

Preferably, in the electrical autonomous pipeline isolation tool of the present invention, the first part comprises a pressure vessel housing and the second part comprises an actuator housing.

The electrical autonomous pipeline isolation tool of the present invention has the advantage that it is a high pressure, autonomous pipeline isolation plug and operates without any of the hydraulic systems needed in the prior art isolation plugs. The isolation tool of the present invention relies entirely on electrical systems. Furthermore, the pipeline isolation tool of the present invention has the advantage that it involves direct electric drive which provides a more efficient and compact isolation tool than the prior art.

Advantageously, the electrical pipeline isolation tool of the invention is completely autonomous, without the necessity for a hydraulic pump and motor, hydraulic accumulator, hydraulic valving, hydraulic piston or hydraulic piping and hydraulic control system. This reduction in number of components, system complexity and tool size relative to the prior art ensures that the electrical pipeline isolation tool of the present invention is simpler to fabricate and assemble and more reliable to operate. A further advantage of the electrical isolation tool of the present invention is that all control and mechanical activation elements of the isolation tool are configured into a single, self contained modular unit. This makes the electrical isolation tool of the present invention more cost effective for operators to build, simpler to use and generally more accessible to all companies engaged in the global pipeline maintenance and repair market.

A further advantage of the electrical pipeline isolation tool of the present invention is that, "off the shelf" components are used; for example, the components that are utilised to populate the main drive, sensors, redundancy and command & communication sections which are contained inside the pressure vessel housing of the isolation tool.

The design of the electrical pipeline isolation tool is dictated by pipeline size. Conveniently, in a further embodiment of the pipeline isolation tool, the pigging, gripping and packer components are machined to ensure that the holding and sealing arrangement are correctly sized and shaped to mirror internal pipeline geometry.

The electrical pipeline isolation tool of the present invention will hereinafter be more particularly described with reference to the accompanying drawings which illustrate, by way of example only, one embodiment of an electrical pipeline isolation tool of the invention.

In the drawings,

FIG. 6 is a side view of the electrical pipeline isolation tool of FIG. 1;

FIGS. 6a to 6d are sectional views of the electrical pipeline isolation tool of FIG. 6 through the lines A-A, B-B, C-C and D-D respectively;

Figure 1:
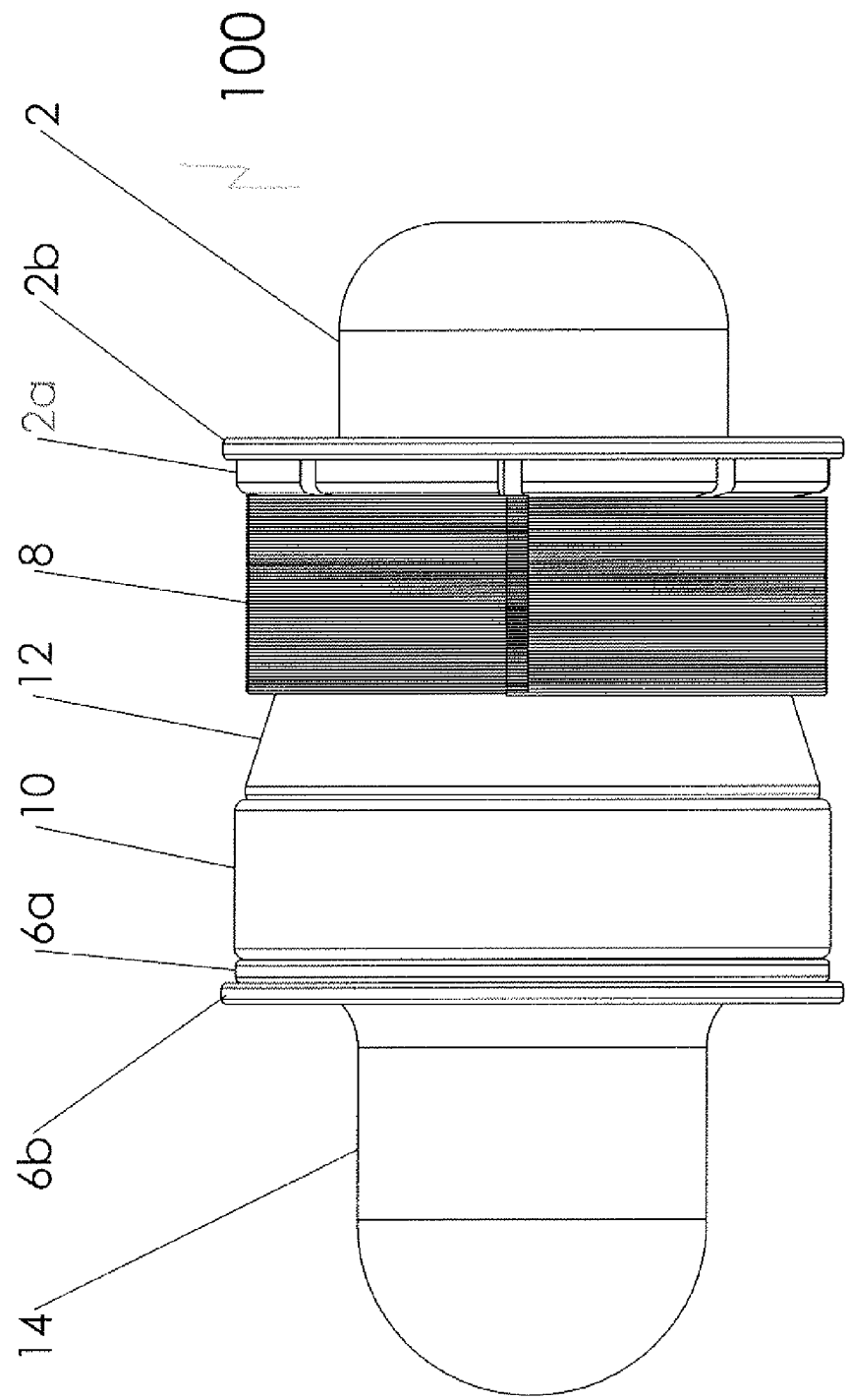
FIG. 1 is a side view of an electrical pipeline isolation tool of the invention.
Figure 2:
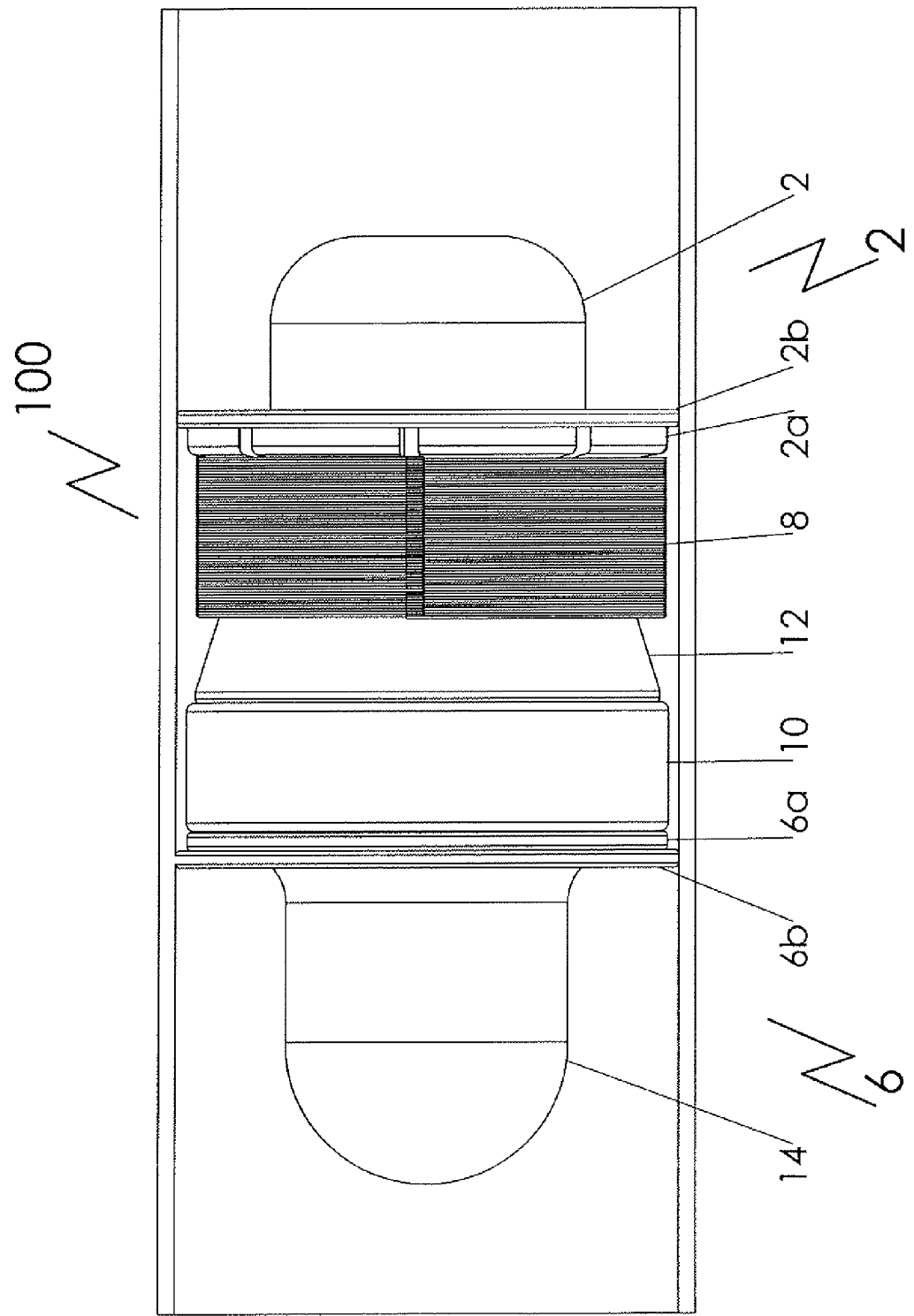
FIG. 2 is side view of the electrical pipeline isolation tool of FIG. 1 in an unset configuration within a pipeline.
Figures 3, 3A:
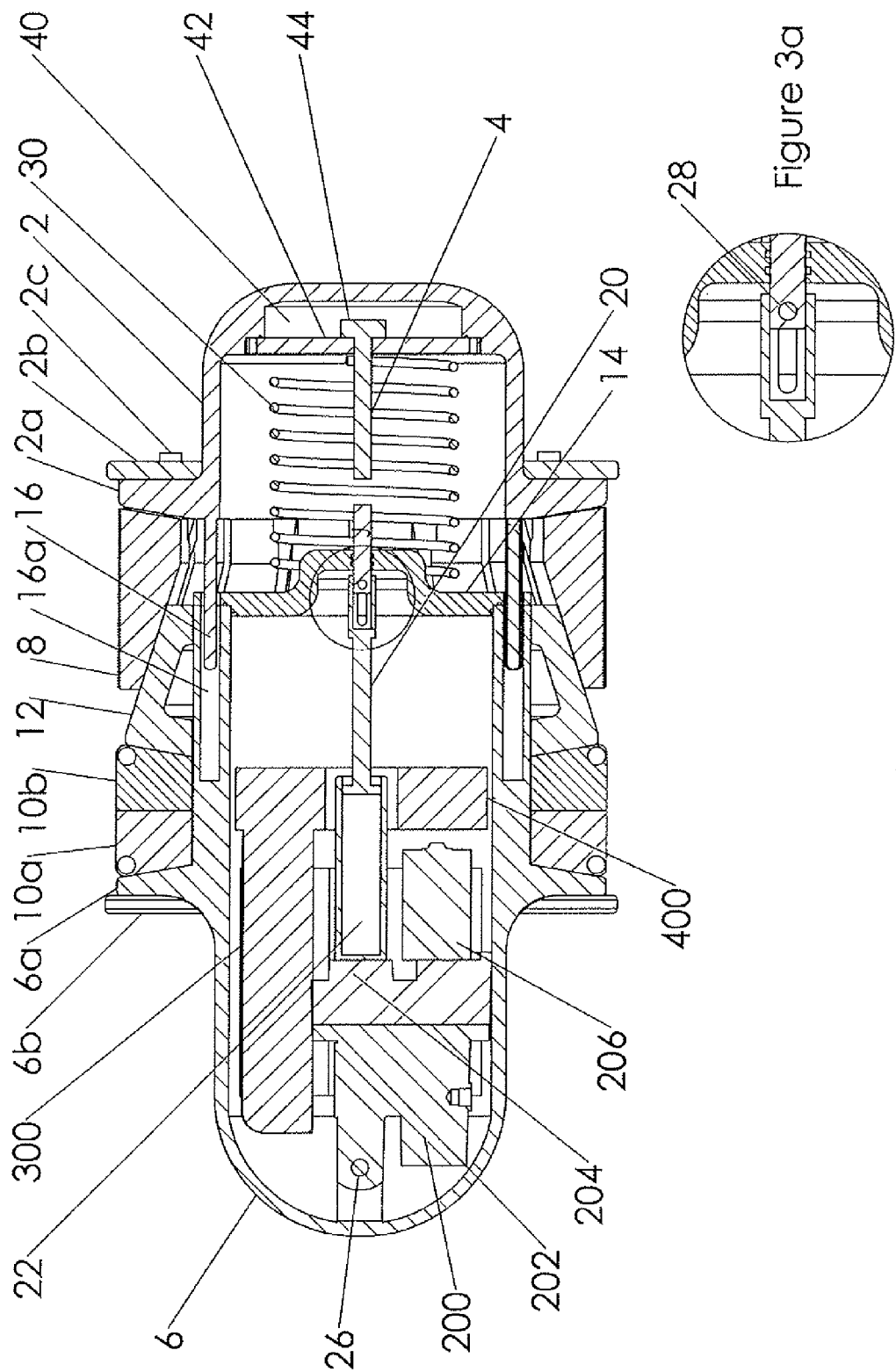
FIG. 3 is a side sectional view of the electrical pipeline isolation tool of FIG. 1 in an unset configuration within a pipeline.
FIG. 3a is an enlarged side sectional view of the joining point of the actuator rod and piston of the electrical pipeline isolation tool of FIG. 3.
Figure 4:
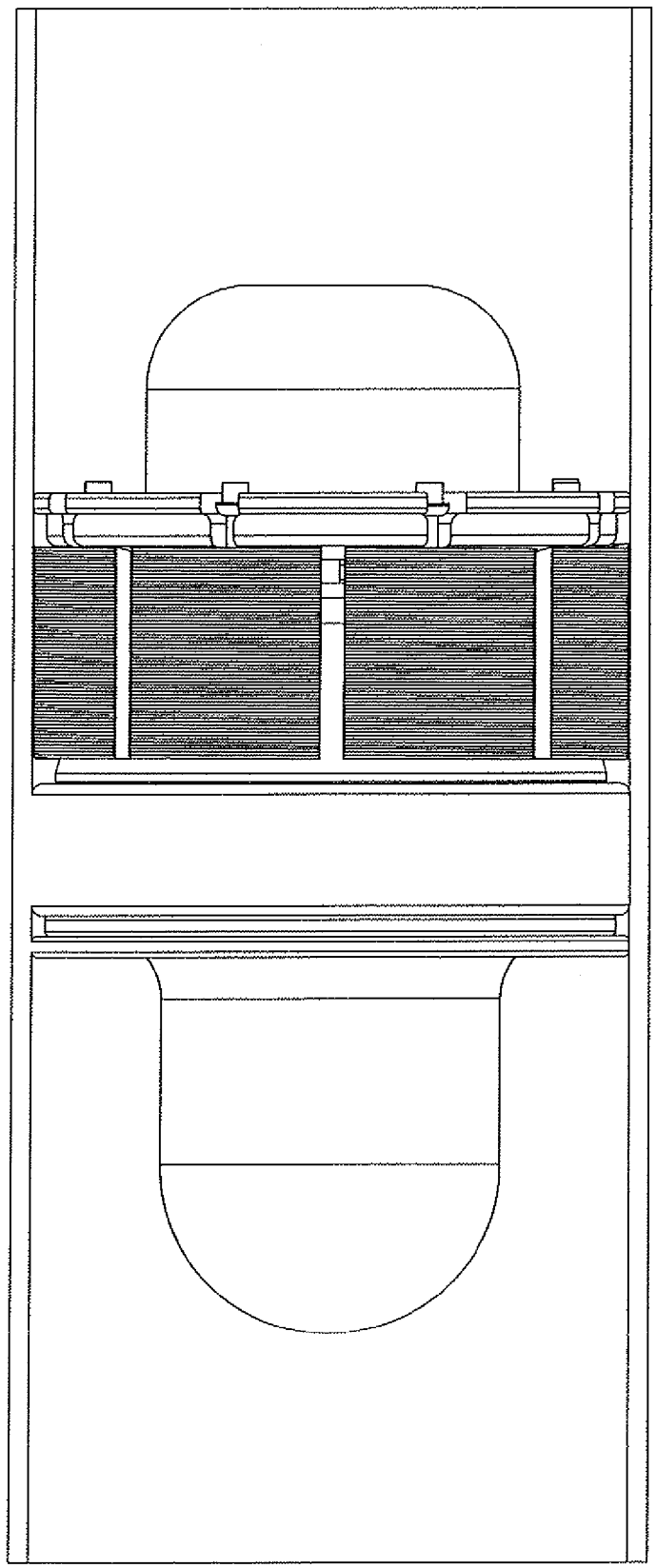
FIG. 4 is a side view of the electrical pipeline isolation tool of FIG. 1 in a set configuration

Referring to the figures and referring initially, particularly to FIGS. 1 and 3, there is shown an electrical autonomous isolation tool 100 in accordance with the invention. The electrical pipeline isolation tool 100 can operate in high pressure environments i.e. high pressure within the pipeline with the pressure in the pipeline typically operating at 200 bar (3000 psi). The isolation tool 100 comprises a pressure vessel housing 6 to which an actuator housing 2 is coupled. It is called a pressure vessel housing because it has a cylinder head 14, which when pressure vessel housing 6 and cylinder head 14 are coupled together form a pressure vessel housing. It is a sealed pressure vessel housing which stays at one atmosphere internal pressure, and is designed to hold back the operating pressure within the pipeline. It keeps all electrical components, batteries, electronics, electrical actuator, motor dry and contained.

Figure 5:
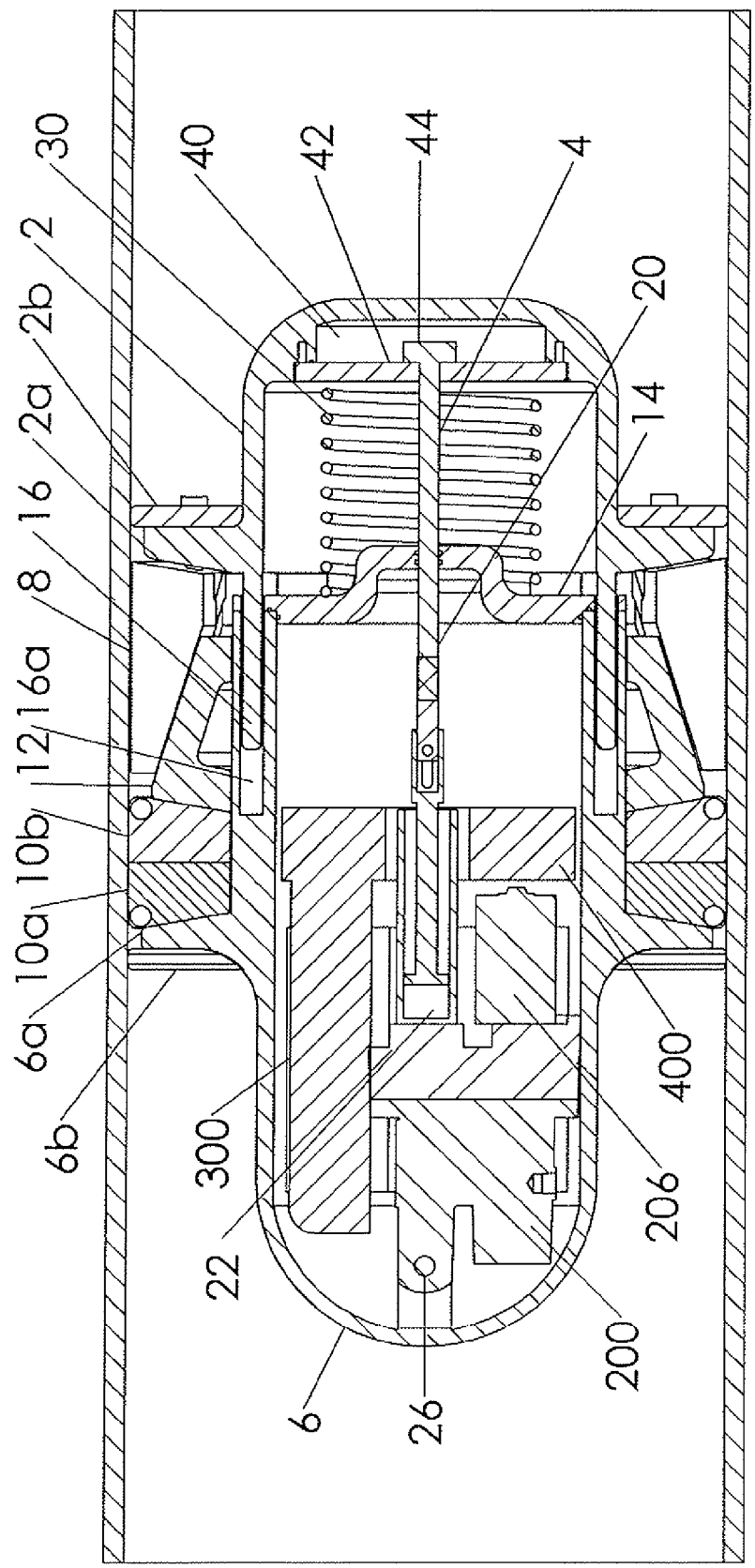
FIG. 5 is a side sectional view of the electrical pipeline isolation tool of FIG. 4 within a pipeline
Figure 7:
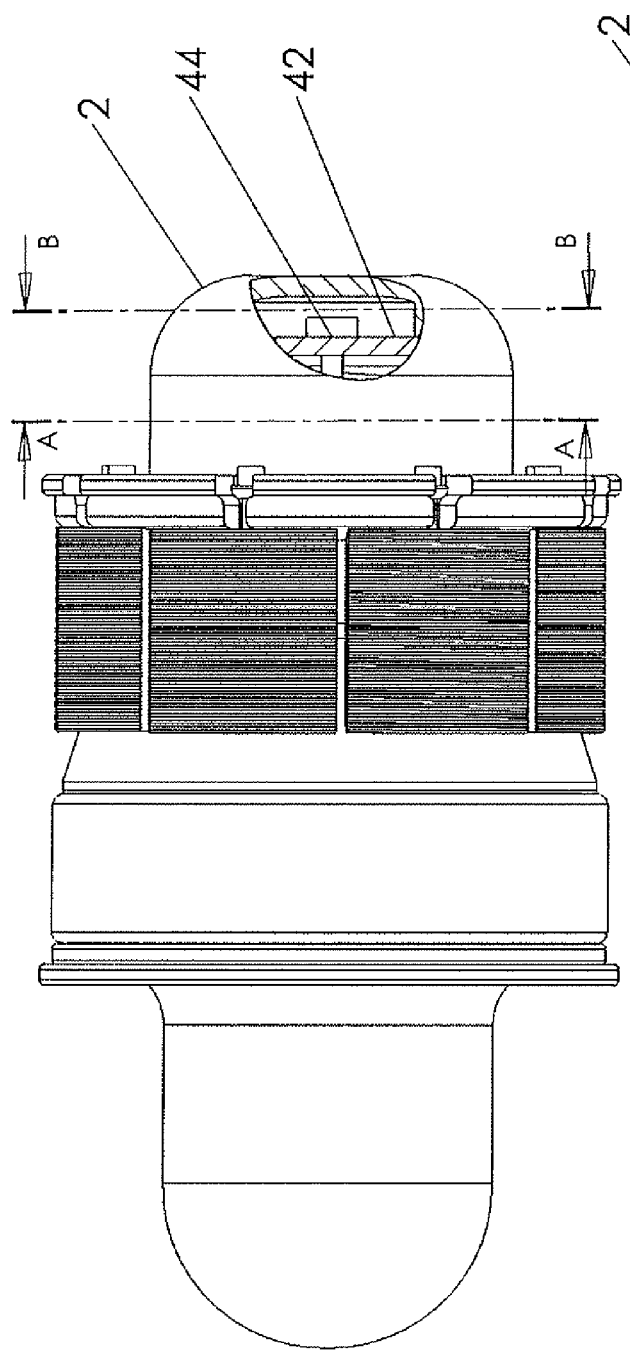
FIG. 7 is a side view of the electrical pipeline isolation tool of FIG. 1.
Figure 7B:
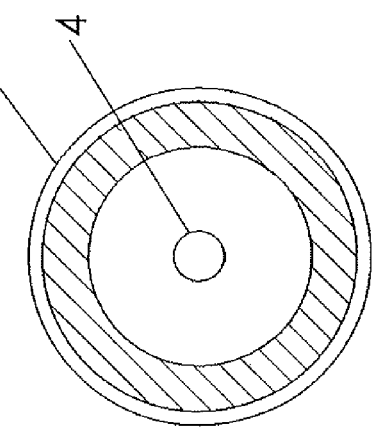
FIGS. 7a and 7b are sectional views of the electrical pipeline isolation tool of FIG. 7 through the lines A-A and B-B respectively.
Figure 7A:
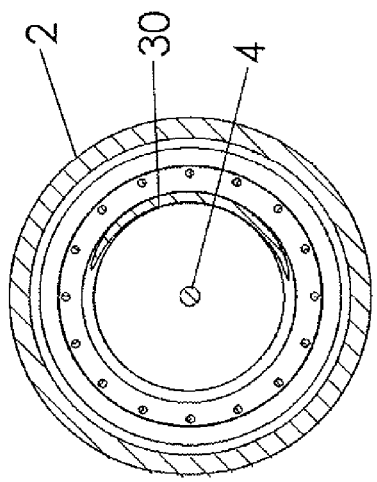

In the embodiment shown, the actuator housing 2 is provided with a plurality of locating pins 16, each of which is moveable into and out of a complimentarily shaped sleeve 16a (shown in FIGS. 3 & 5) on the pressure vessel housing 6. The locating pins 16 are coated with a layer of Teflon to reduce friction as the locating pins 16 move within the receptacle 16a in the cylinder housing 6. The locating pins 16 guide the travel of the actuator housing 2 and the pressure vessel housing 6.

In use, the pipeline isolation tool 100 is moved to location within a pipeline using any one of the known standard methods for this movement to a desired location in a pipeline, for example, in the embodiment shown, the isolation tool is provided with pigging disks 2b and 6b, respectively on the actuator housing 2 and the pressure vessel housing 6. The pigging disks 2b and 6b enable the isolation tool to be transported to the required location within a pipeline using fluid (the term "fluid" including liquid and/or gas). Other examples of methods for moving the isolation tool 100 to a desired location in a pipeline include propelling the isolation tool 100 into the pipeline using a hydraulic ram at the entrance to a pipeline or by pushing/pulling the isolation tool 100 using a robotic unit.

The electrical autonomous isolation tool 100, comprises a piston rod 20 which is moveably located in a return chamber 22 which is positioned within the pressure vessel housing 6. At one end, the piston 20 is connected to the actuator housing by an actuator rod 4 (FIG. 3) while at the other end, the return chamber 22 is secured inside the pressure vessel housing 6 by fixing means 26, for example a clevis and pin.

The pressure vessel housing 6 becomes a one atmosphere ATEX rated dry pressure vessel housing, when the cylinder head 14 is sealed on its end. Seated within the pressure vessel housing 6 and surrounding the fixing means 26, are power module 200; electronics module 300; and communications and control module 400. The power module 200 comprises a battery 208, a capacitor 202, a motor 206 and a gear box 204. One or more diagnostic sensors such as integral pressure transmitters, and such like (not shown) are placed within the pressure vessel housing 6 and compartment 40 of the actuator housing 2 of the pipeline isolation tool 100. Each pressure transmitter is in communication with the control module 400.

The pressure vessel housing 6 also contains one or more digital position indicators (not shown) which process feedback signals from potentiometers installed to provide position readout with selectable scaling factors. In the embodiment shown, the preferred location of the potentiometers is on the piston rod 20.

Power module 200 for the electrical pipeline isolation tool 100 is powered by a Lithium Sulphur Dioxide ($LiSO_2$) primary battery system providing 12 volts of direct current. Communications and control module 400 comprises a split frequency, Extremely Low Frequency (ELF) control and communications system which enables a user to pass commands to the isolation tool 100. The ELF control and communications system also provides a user with status information and feedback from the pipeline isolation tool 100 collected from one or more diagnostic sensors positioned within and around the pipeline isolation tool 100. The communications module also contains an integrated aerial system for passing ELF magnetic data to and from the pipeline isolation tool 100 through the pipe wall.

The actuator housing 2 further comprises a spring 30. It is to be understood that the actuator can contain any number of springs as required by the pipeline isolation tool 100. However, for the sake of clarity, only one spring is shown in the drawings. In the embodiment shown, the spring 30 is a compression spring. The spring 30 of the pipeline isolation tool 100 is pre-tensioned when placed within the actuator housing 2. This is to ensure that the isolation tool 100 is fully unset in its normal travelling condition. When the actuator flange 2a is pushed fully away from the pressure vessel housing—(i.e. the overall length of the tool is at its maximum) then the grips 8 are completely retracted from the slope of the bowl 12, because the grips 8 are connected at their back, by grip retention studs 2c, which hold the back of the grips in contact with the actuator flange 2a. The hole in the actuator flange that the grip retention studs 2c are connected into, is not a round hole in the actuator flange 2a, but is a longitudinal slot (which allows the grips 8 to slide up the slope of the bowl 12, but still connects the grips 8 to the actuator flange 2a, as the grip retention studs 2c, slide up the slot in the actuator flange 2a.

The Electrical pipeline isolation tool spring has two conditions; namely, pre-compressed and heavily compressed:

Pre-compressed—in which case the spring is squeezed and is doing some work. When the spring (or springs) is placed into the actuator flange housing, the spring is designed longer than the available distance in the housing, Therefore the spring sitting in the confines of the actuator housing will be pre-compressed, meaning it is pushing the actuator flange housing 2 as far away as possible from the pressure vessel housing 6, and the only thing which will be holding the actuator flange 2 onto the pressure vessel housing 6 is the piston rod 20 and actuator rod 4 (which is an extension of the piston rod 20). This is to ensure the isolation tool is in the fully UNSET condition.

Heavily Compressed

This is when the piston rod 20 has been pulled into the space 22 within the electric actuator, and in doing so, it is fighting the tension of the spring 30. By the time the grips 8 are on the wall of the pipeline, and the packer 10 has some squeeze in it to make a seal, the spring 30 will be under considerable compression. This compression is required as a fail-safe back up mechanism in the event of the electric actuator mechanism failing when the electrical autonomous isolation tool is in the SET condition. Then the release mechanisms can be initiated to disengage the piston rod 20 or disconnect the actuator rod 4 and then the compressed spring, would push the actuator housing 2 and its incorporated actuator flange 2a away from the grips 8—but it can't push away from the grips 8, because the grips 8 are attached by the grip retention studs 2c to the actuator flange 2a. Therefore the grips 8 are pulled down the slope of the bowl 12 and the actuator housing 2 moves away from the pressure vessel housing 6 and the isolation tool 100 becomes fully UNSET due to the work of the heavily compressed spring looking for zero compression.

The spring 30 is correctly configured so that when it is compressed during the setting process, it provides the emergency release energy, within its compressed tension. In use, the actuator housing 2 and the pressure vessel housing 6 are pulled together to enable the tool to be set in order to isolate the pipeline. The electrical actuator pulls the actuator 2 closer into the pressure vessel housing 6, to make the actuator flange 2a push the back face of the grips 8 up the bowl 12, to set the grips 8 into the pipeline wall to lock the isolation tool to the pipeline wall.

It is essential to ensure that there is capacity for further compression available to the spring 30 to prevent the spring 30 from becoming solid and stopping the pipeline isolation tool 100 from setting fully.

In the embodiment shown, standard safety components such as a friction clutch with end of travel protection and internal limit switches having integral brakes are provided within the cylinder head 6. In this way, a load applied to the pipeline isolation tool 100 and more specifically, applied to the piston 20 of the pipeline isolation tool 100 is prevented from back-driving the actuator rod 4. In this way, actuator housing 2 is configured for both tensioning and compression.

After the ElectroPlug is SET (i.e. the grips 8 are locked on the pipeline wall and the grips 8 and bowl 12 are thereby locked together into the pipeline) and the packer is set—at this point, the pressure vessel housing 6 and actuator flange 2 have been pulled almost all the way, together.

However, when the full downstream delta (the pipeline pressure) is applied to the pressure vessel housing 6 side of the pipeline isolation tool, by dropping the upstream pressure on the actuator flange 2 side of the tool, then there is further movement in the tool.

The pressure vessel housing is then pushed closer towards the actuator flange, because of the enormous force suddenly coming on it, from the downstream delta.

In this configuration the grips 8 cannot move and the bowl 12 cannot move as it is locked to the grips. The packer 10 gets squeezed further by the movement of the pressure vessel housing 6—as the pressure vessel housing is able to move (it slides a little inside the packer 10 and inside the bowl 12) as these are sized slightly larger (about 1 mm all round) than the pressure vessel housing.

Now referring to FIG. 3a, if the pressure vessel housing 6 moves, then it would break the piston rod 20 of the electric actuator, because the piston rod is locked, as the electric actuator is not operating at this stage.

But as can be seen from FIG. 3a, there is a slot into the piston rod 20, so that the connection pin 28 between the actuator rod 4 and the piston rod 20 can SLIDE within a slot in the coupling, to ABSORB this downstream delta compression, and stop the piston rod 20 from being broken.

The actuator is provided with an actuator flange 2a to which is attached the adjacent pigging disk 2b. The actuator flange 2a combines with the packer 10 to retain the upstream pressure (note upstream pressure comes from the 44 side and downstream pressure from the 26 side).

The pressure vessel housing 6 is provided with pressure vessel housing flange 6a to which is attached adjacent pigging disk 6b. The sealing means is provided by gripping means 8 and packing means 10a and 10b which encircle the body of the pressure vessel housing 6 between the actuator flange 2a and pressure vessel housing flange 6a. Gripping means 8 and packing means 10a & 10b are designed depending on the internal diameter and wall thickness of the pipeline to be isolated and on the material of the pipeline which is being isolated. Thus, different sized isolation tools are required for different sized pipelines. The outside shell of the grips 8 must match exactly the internal diameter of the pipeline.

In practice, the packing means 10b comprises packer material which varies between a relatively soft packer material, for example of 65 Duro Scale B hardness and a harder packer material 10a for example of 75 Duro Scale A hardness. In the example shown the packer material comprises a joined low pressure packer 10b material at 65 Duro Scale B hardness and a high pressure packer 10a material at 75 Duro Scale A hardness. The softer material is located on the upstream side and the harder material is on the downstream side, against the 6a pressure vessel housing flange.

In this way, when the packing means 10a and 10b are brought into engagement with the internal surface of the pipeline wall, the relatively soft packer 10b material forms an initial seal on the wall of the pipeline. As further pressure is applied to the packing means, the harder packer 10a material deforms forming a more robust seal than formed by the softer packer material.

Ramp means 12 also encircle the pressure vessel housing 6 in between the gripping means 8 and packing means 10a and 10b. Ramp means 12 is shaped such that an angle is formed between the circumferential edge of the ramp means 12 and the internal circumferential edge of the grips 8. It is noted that in this embodiment of the invention, the ramp means 12 are not fixed to the body of the pressure vessel housing 6. The ramp means of the invention is of a predetermined size. In this particular embodiment of the invention the ramp means 12 is approximately 2 mm larger in internal diameter than the pressure vessel housing 6 allowing it to move freely along the body of the pressure vessel housing.

Once the electrical isolation tool 100, is at the desired location, instructions are sent to the electrical pipeline isolation tool 100 via the communications control module 400 to move into the "set" configuration whereby the gripping means 8 and packing means 10 are brought into engagement with the internal pipeline wall so as to isolate a section of the pipeline.

The mechanism by which the electrical isolation tool 100 is moved into the "set" configuration such that it isolates a section of pipeline will now be described. Retraction of the piston 20 into the return chamber 22 pulls the actuator rod 4 into the pressure vessel housing 6, through cylinder head 14, thereby compressing spring 30 within actuator housing 2. Movement of the actuator rod 4 pulls the actuator housing 2 towards the cylinder head 14 as these are connected at the actuator rod release 44. The electric actuator piston is energised and pulls piston rod 20 in. The piston rod 20 is connected to the actuator flange release 44 and this pulls the actuator 2 towards the cylinder head 14 and compresses the spring 30. This action pushes the grips 8 up the bowl 12 to engage the pipeline wall and grip. This then locks the grips 8 and bowl 12 and pipeline wall together as one unit. When that happens, it enables any further piston rod 20 pull in operation, to squeeze the packer 10, force it out on the pipeline wall and form a seal.

Each of the locating pins 16 are drawn into their respective sleeves 16a. The distance between the gripping means 8 and the packing means 10 is shortened. As the distance between the gripping means 8 and the packing means 10 is shortened, the gripping means 8 are forced to travel up the ramp. This movement continues until the gripping means 8 can no longer travel any further as its gripping surfaces come into radial contact with the pipeline wall. The gripping means 8 fully occupies the space between the ramp 12 and the pipeline wall in a wedged arrangement where the gripping means 8 are fully engaged on the pipeline wall. This forms a mechanical lock for the isolation tool 100 which when further compressed places a relatively small squeeze on the packing means 10b which is sufficient to initiate the process of bringing the softer pressure packer material of 65 Duro Scale B hardness into engagement with the pipeline wall. When the electric actuator is energised, the piston rod 20 is pulled further to pull the actuator 2 closer; however, the actuator 2 cannot pull any closer because the actuator flange 2a is butted up against the grips 8, which are wedged solid between the bowl 12 and the pipeline wall. Therefore, pulling further on piston rod 20 pulls the entire pressure vessel housing 6 and its pressure head flange 6a to the right (towards 44) which starts the squeeze on the packer The piston 20 continues to retract into the return chamber 22 which draws the pressure vessel housing 6 towards the actuator housing 2 by compressing the packing means 10b further. The packing means is squeezed outwards and the softer packer 10b material at 65 Duro Scale B hardness is thereby brought into engagement with the pipeline wall.

In practice, once a seal has been achieved by the softer packer material 10b, the piston 20 is stopped and the pressure on the actuator 2 side of the isolation tool 100 is dropped. This introduces a pressure differential (δ) across the isolation tool 100 which further increases the sealing functionality of the isolation tool 100 by bringing the harder packer 10a material of 75 Duro Scale A hardness into engagement with the pipeline wall.

In the embodiment shown, the distance between the two flanges 2a and 6a when the isolation tool 100 is in the unset configuration is approximately 432.62 mm and when the isolation tool is in a set configuration, the distance between the two flanges is approximately 382.61 mm.

The electrical autonomous isolation tool 100 of the invention has three levels of unset redundancy. Before movement into the UNSET condition can be initiated, the differential pressure across the isolation tool must first be balanced i.e. zero and zero, 100 bar and 100 bar, 200 bar and 200 bar etc.

The primary unset redundancy (once the pressure across the isolation tool is balanced) is a normal electric linear actuator unset which, in effect, causes the setting process to be reversed. In practice, this means that the piston 20 is moved out of the return chamber 22, forcing the actuator rod 4 out of the cylinder housing 6, thereby releasing the tension on spring 30 which in turn enables the actuator housing 2 to move away from the pressure vessel housing 6, which in turn enables the gripping means 8 to move back down the ramp 12 thus releasing the gripping and packing means 8 and 10a & 10b from the pipeline wall.

The secondary unset redundancy (once the pressure across the isolation tool is balanced) is a hydrostatic release mechanism whereby the connection between actuator rod 4 and piston 20 is provided with a pressure spike hydrostatic release mechanism which uncouples the actuator rod 4 from the piston 20 disconnecting the spring 30 capture allowing the spring 30 to force the actuator housing 2 away from the pressure vessel housing 6. As the actuator 2 moves away from the pressure vessel housing 6, the gripping means 8 and packing means 10 disengage from the pipeline wall.

The tertiary unset mechanism (once the pressure across the isolation tool is balanced) is a timed decay unset redundancy. The actuator housing 2 is provided with a separate sealed area 40 which houses the tertiary unset mechanism. Area 40 is separated from the main section of the actuator housing 2 by a pressure plate 42. Although not shown in the drawings, O-rings are fitted between the pressure plate and the actuator housing 2 to ensure that area 40 is sealed from the actuator housing 2. The tertiary unset system comprises an independent printed circuit board, power supply and activation means. The activation means of the tertiary unset system is a real time clock. Once the real time clock has reached a pre-set trigger value, a compressed gas charge such as Nitrogen ($N_2$) is released which, in turn, releases locking pin 44. Locking Pin 44 disconnects the actuator rod 4 from the piston 20, allowing spring 30 to decompress thereby releasing the pipeline isolation tool 100, in the same way as described above.

Although not shown in the drawings, the electrical pipeline isolation tool 100 is also provided with articulation means such as a double articulated ball joint housing to couple a second electrical Isolation System into a isolation tool train in order to meet standard Double Block and Bleed isolation barrier requirements.

The electrical pipeline isolation tool 100 is made from high strength titanium 6AI 4V. This gives the pipeline isolation tool 100 a very high strength to weight ratio. It also is a relatively light material when compared with materials traditionally used in isolation tools, thereby making the isolation tool 100 easier to transport and handle than known isolation tools.

A robotic propulsion unit can be integrated at each end of the isolation tool 100, depending on pipeline and tool size.

The isolation tool is provided with pigging disks 2b and 6b which enable the electrical isolation tool of the invention to be pigged and used in monoethyleneglycol (MEG) condensate or any other oil, liquid or gas environment It will of course be understood that the invention is not limited to the specific details described herein, which are given by way of example only, and that various modifications and alterations are possible within the scope of the invention as defined in the appended claims.

The invention claimed is:

1. A self contained modular electrical autonomous pipeline isolation tool suitable for use in high pressure environments, in offshore and onshore oil and gas or any other fluid pipeline isolation, the electrical autonomous pipeline isolation tool configured as a single unit comprising:
    a first part and a second part, the first part comprising a pressure vessel housing and the second part comprising an actuator housing, the first and second parts being moveable relative to each other, the pipeline isolation tool being controllable using a communications system;
    at least one sealing member which is moveable between an unset condition, in which the at least one sealing member is disengaged and the isolation tool is able to travel along inside a pipeline to a predetermined location, and a set condition, in which the sealing member is engaged against an internal wall of the pipeline such that a seal is formed between the sealing member of the isolation tool and the internal wall of the pipeline, wherein the isolation tool being moveable between the unset condition and the set condition under action of the first part and the second part moving relative to each other;
    a piston rod, wherein the piston rod is electrically actuated to move the isolation tool into the set condition; and
    a power module contained within the pressure vessel housing of the single unit electrical autonomous pipeline isolation tool,
    wherein the electrical autonomous pipeline isolation tool does not include any hydraulic systems.

2. The electrical autonomous pipeline isolation tool as claimed in claim 1, wherein the actuator housing is provided with a plurality of locating pins, each of which is moveable in a complimentarily shaped sleeve in the pressure vessel housing.

3. The electrical autonomous pipeline isolation tool as claimed in claim 1, wherein the a piston rod is moveably located in a return chamber, the return chamber being positioned within the pressure vessel housing.

4. The electrical autonomous pipeline isolation tool as claimed in claim 3, wherein at one end, the piston is connected to the actuator housing by an actuator rod while at the other end, the return chamber is secured to the pressure vessel housing by fixing means.

5. The electrical autonomous pipeline isolation tool as claimed in claim 1, wherein an electronics module, a communications module and a control module are seated within the pressure vessel housing.

6. The electrical autonomous pipeline isolation tool as claimed in claim 1, wherein one or more diagnostic sensors are seated within the pressure vessel housing.

7. The electrical autonomous pipeline isolation tool as claimed in claim 1, wherein one or more diagnostic sensors are seated within a compartment of the actuator housing.

8. The electrical autonomous pipeline isolation tool as claimed in claim 1, wherein the sealing means is provided by gripping means and packing means which encircle the body of the cylinder housing.

9. The electrical autonomous pipeline isolation tool as claimed in claim 1, wherein the isolation tool includes a pressure vessel housing flange and an actuator housing flange.

10. The electrical autonomous pipeline isolation tool as claimed in claim 9, wherein the sealing means is provided by gripping means and packing means which encircle the body of the cylinder housing between the actuator flange and the pressure vessel housing flange.

11. The electrical autonomous pipeline isolation tool as claimed in claim 8, wherein the packing means comprises packer material which varies between a relatively soft packer material, and a harder packer material such that, when the packing means is brought into engagement with the internal surface of the pipeline wall, the relatively soft packer material forms an initial seal on the wall of the pipeline and as further pressure is applied to the packing means, the harder packer material deforms forming a more robust seal.

12. The electrical autonomous pipeline isolation tool as claimed in claim 1, wherein the communications system is an Extremely Low Frequency (ELF) communications system.

13. The electrical autonomous pipeline isolation tool as claimed in claim 1, wherein the actuator housing further comprises at least one spring.

14. The electrical autonomous pipeline isolation tool as claimed in claim 13, wherein the at least one spring is movable between a precompressed condition in which the actuator housing is positioned at the furthest point from the pressure vessel housing and a heavily compressed condition in which the actuator housing and pressure vessel housing are pulled together thereby enabling the electrical autonomous pipeline isolation tool move between the unset condition and the set condition.

15. The electrical autonomous pipeline isolation tool as claimed in claim 1, wherein the electrical autonomous pipeline isolation tool comprises an electrical linear actuator unset redundancy mechanism.

16. The electrical autonomous pipeline isolation tool as claimed in claim 1, wherein the electrical autonomous pipeline isolation tool comprises a hydrostatic release unset redundancy mechanism.

17. The electrical autonomous pipeline isolation tool as claimed in claim 1, wherein the electrical autonomous pipeline isolation tool comprises a timed decay unset redundancy mechanism.

18. The electrical autonomous pipeline isolation tool as claimed in claim 1, wherein the electrical autonomous pipeline isolation tool further comprises articulation means.

* * * * *